United States Patent Office.

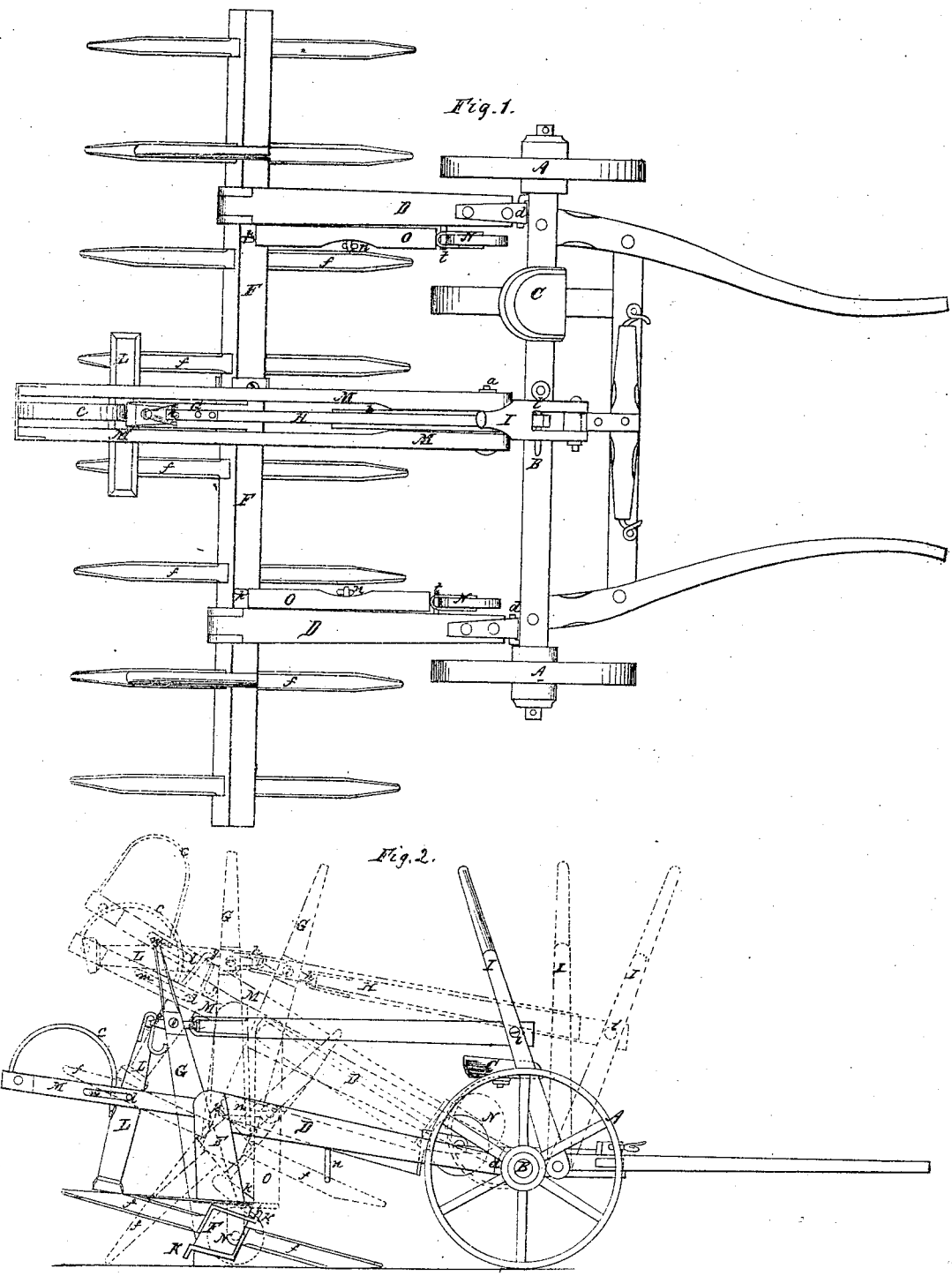

MYRON MILES, OF MIDDLESEX, NEW YORK.

Letters Patent No. 72,315, dated December 17, 1867.

---

IMPROVEMENT IN HORSE-RAKES.

---

The Schedule referred to in these Letters Patent and making part of the same.

---

TO ALL WHOM IT MAY CONCERN:

Be it known that I, MYRON MILES, of Middlesex, in the county of Yates, and State of New York, have invented an Improved Horse-Rake; and I do hereby declare that the following is a full and exact description thereof, reference being had to the accompanying drawings, making part of this specification—

Figure 1 being a plan of the rake.

Figure 2 a side elevation thereof.

Like letters designate corresponding parts in both figures.

My invention is an improved drag-rake, F, drawn behind a pair of wheels, A A, being connected with the axle B thereof by a pair of knee-shaped draw-bars, D D, which are hinged at $d\ d$ to the axle, and in the lower rear ends of which the rake-head is pivoted. The knee form is to enable the rake to be brought down close to the ground, and still allow sufficient room under the draw-bars, in front of the rake, to hold the hay. A driver's seat, C, is located on the axle B, and in this position he regulates all the movements of the rake, by means of an upright lever, I, pivoted at the lower end, just in front of the axle, while the upper end terminates in a handle to be held by the driver. To this lever I, a connecting-rod, H, is pivoted, at $i$, somewhere about midway of the lever, (the position being adjustable, if desired,) and extends thence backward to a guide-standard, G, to which it is pivoted at $h$, near the upper end, or nearly on a level with its front end. This guide-standard has a bearing at its lower end, in which the rake-head turns, and to it is pivoted the pawl $k$, which holds against the catches K K on the rake-head, to keep the front teeth down on the ground. By pushing forward the lever I, thereby drawing on the connecting-rod H and guide-standard, the rake is raised sufficiently to allow it to turn over and discharge the hay, when sufficiently accumulated, and it may be lifted thereby away from the ground, to clear obstructions, if necessary. To a projecting arm, $b$, or otherwise, just behind the axle B, a pair of brace-bars, M M, are hinged, at $a$, and these extend back outside and to the rear of the guide-standard G, substantially as represented. In these, near the rear end, are horizontal slots, $m\ m$, a few inches long, in which plays a pin or projection, $l$, of the stop or "clapper" L, which is suspended, at $g$, from the guide-standard G, and holds the rake from turning, by resting upon or against one or two of the rear teeth of the rake. The stop-pin $l$ is ordinarily kept pressed forward in the front ends of the slots $m\ m$, by a spring, $c$, mounted on the brace-bars M M, substantially as shown, and, in this position, the rake is held in the right position for operation, as indicated by black lines in fig. 2; and when the rake is to be turned over for discharging the hay, the act of moving forward the lever not only raises the rake, but moves the stop L upward and backward, so as to clear it from the way of the rake-teeth, in order to allow the rake to turn over. This effect is produced by the drawing forward of the guide-standard G, to which the upper end of the stop is pivoted, while its pin $l$ is held back in the slots $m\ m$ of the brace-bars, thereby causing the stop to turn upward around said pin as a fulcrum. The use of the slots $m\ m$ is to enable the stop to be moved backward by moving the lever I in that direction, the effect of which movement is to cause the stop to depress the rear teeth of the rake, and consequently raise the front rake-teeth several inches from the ground, for the purpose of clearing and passing over hummocks, knolls, rocks, and other obstructions. This may raise the front teeth eight inches (more or less,) and it is a very important improvement, requiring no additional parts, except the slots $m\ m$, and no other operation by the driver, except to reverse the ordinary movement of the lever I. Instead of turning the rake up over the axle, to support it in drawing to and from the field, or from one place to another, I combine with it a pair of carrier or caster-wheels, N N, which are swivelled to standards, O O, and these standards are pivoted at their upper ends respectively to the draw-bars D D, in such a manner that by bringing them down into a vertical position, and securing them there by hasps or hooks, $n\ n$, and staples, $p\ p$, on the rake-head, or on the draw-bars, the caster-wheels will then support the rake sufficiently elevated above the ground for transportation, as indicated by blue lines in fig. 2. When the rake is in operation the caster-standards are swung up inside of the draw-bars, and are supported by pins $t\ t$, fig. 1, or their equivalent, so as to be out of the way.

What I claim as my invention, and desire to secure by Letters Patent, is—

The combination and arrangement of the hinged draw-bars D D, guide-standard G, connecting-rod H, brace-bars M M, and stop L, substantially as herein specified.

I also claim the slots $m\ m$ in the brace-bars, and the spring $c$, in combination with the stop L, for the purpose herein specified.

I also claim the arrangement of the caster or carrier-wheels N N, in combination with the rake, and with the draw-bars D D, substantially as and for the purpose herein set forth.

The above specification of my improved horse-rake signed by me, this 30th day of March, 1867.

MYRON MILES.

Witnesses:
JOHN A. FISHER,
CHAPIN L. HAWLEY.